(12) United States Patent
Nelson et al.

(10) Patent No.: US 8,448,885 B2
(45) Date of Patent: May 28, 2013

(54) METHODS OF COMPOUNDING NANOPARTICLES WITH A RESIN

(75) Inventors: James M. Nelson, Woodbury, MN (US); Daniel P. Decabooter, Woodbury, MN (US); James E. Thorson, Hudson, WI (US); Jung-Sheng Wu, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 409 days.

(21) Appl. No.: 12/996,730

(22) PCT Filed: Jun. 12, 2009

(86) PCT No.: PCT/US2009/047150
§ 371 (c)(1),
(2), (4) Date: Dec. 7, 2010

(87) PCT Pub. No.: WO2009/152404
PCT Pub. Date: Dec. 17, 2009

(65) Prior Publication Data
US 2011/0079668 A1   Apr. 7, 2011

Related U.S. Application Data

(60) Provisional application No. 61/060,887, filed on Jun. 12, 2008.

(51) Int. Cl.
*B02C 19/00* (2006.01)
*B02C 21/00* (2006.01)

(52) U.S. Cl.
USPC .............................. 241/21; 241/22

(58) Field of Classification Search
USPC .............................. 241/21, 22, 25
See application file for complete search history.

(56) References Cited

U.S. PATENT DOCUMENTS

| | | | |
|---|---|---|---|
| 4,447,564 A | 5/1984 | Grimmer |
| 4,478,963 A | 10/1984 | McGarry |
| 4,624,971 A | 11/1986 | Van Tao et al. |
| 5,648,407 A | 7/1997 | Goetz et al. |
| 5,694,701 A | 12/1997 | Huelsmann et al. |
| 5,980,697 A | 11/1999 | Kolb et al. |
| 6,342,100 B1 | 1/2002 | Nover |
| 7,596,986 B2 | 10/2009 | Daniels et al. |
| 2001/0040007 A1 | 11/2001 | Hartman et al. |
| 2002/0156152 A1 | 10/2002 | Zhang et al. |

(Continued)

FOREIGN PATENT DOCUMENTS

| EP | 1 426 390 | 6/2004 |
|---|---|---|
| EP | 2 036 944 | 3/2009 |

(Continued)

OTHER PUBLICATIONS

Avella et al., "Novel PMMA/CaCO$_3$ Nanocomposites Abrasion Resistant Prepared by an in Situ Polymerization Process," *Nano Letters*, vol. 1, No. 4, pp. 213-217, (2001).

(Continued)

*Primary Examiner* — Faye Francis
(74) *Attorney, Agent, or Firm* — Dena M. Ehrich

(57) ABSTRACT

Methods of compounding nanoparticles (e.g., surface-modified silica nanoparticles) with a resin (e.g., a curable resin) are described. The methods use continuous wet milling technology and can be used to compound nanoparticles, including highly aggregated and agglomerated surface-modified nanoparticles, into a resin or resin precursor.

15 Claims, 3 Drawing Sheets

U.S. PATENT DOCUMENTS

| | | |
|---|---|---|
| 2003/0032693 A1 | 2/2003 | Angeletakis et al. |
| 2003/0055207 A1 | 3/2003 | Xu et al. |
| 2004/0076574 A1 | 4/2004 | Xu et al. |
| 2004/0092639 A1 | 5/2004 | Kasahara et al. |
| 2007/0199477 A1 | 8/2007 | Hill et al. |
| 2008/0075963 A1 | 3/2008 | Dershem |
| 2008/0227901 A1 | 9/2008 | Lefevre et al. |
| 2009/0137706 A1 | 5/2009 | Healy et al. |

FOREIGN PATENT DOCUMENTS

| | | |
|---|---|---|
| JP | 2006 188552 | 7/2006 |
| WO | WO 00/49081 | 8/2000 |
| WO | WO 03/057740 | 7/2003 |
| WO | WO 2007/014878 | 2/2007 |
| WO | WO 2007/108217 | 9/2007 |
| WO | WO 2008/027979 | 3/2008 |
| WO | WO 2010/080459 | 7/2010 |
| WO | WO 2011/050121 | 4/2011 |

OTHER PUBLICATIONS

Jin et al., "Interfacial toughness properties of trifunctional epoxy resins/calcium carbonate nanocomposites," *Materials Science and Engineering A*, 475, pp. 190-193, (2008).

Kresse et al., "Ab initio molecular-dynamics simulation of the liquid metal-amorphous-semiconductor transition in germanium," *Physical Review B*, vol. 49, No. 20, pp. 14251-14271, (May 15, 1994).

Kresse et al., "Ab initio molecular-dynamics for liquid metals," *Physical Review B*, vol. 47, No. 1, pp. 558-561, (Jan. 1, 1993).

Kresse et al., "Efficiency of ab-initio total energy calculations for metals and semiconductors using a plante-wave basis set," *Computational Materials Science* 6, pp. 15-50, (1996).

Kresse et al., "Efficient iterative schemes for ab initio total-energy calculations using a plane-wave basis set" *Physical Review B*, vol. 54, No. 16, pp. 11169-11186, (Oct. 15, 1996).

Melo et al., "High Energy Mill Processing of Polymer Based Nanocomposites", Journal of Composite Materials, 2363, (2008).

Lu et al., Polymer/calcium carbonate nanocomposites, *Polymer Nanocomposites*, CRC Press, pp. 412-439, (2006).

Perdew et al., "Generalized Gradient Approximation Made Simple," *Physical Review Letters*, vol. 77, No. 18, pp. 3865-3868, (Oct. 28, 1996).

Van Krevelen, *Properties of Polymers: Their Correlation with Chemical Structure; Their Numerical Estimation and Prediction from Additive Group Contributions*, third edition, Elsevier Science Publishers B.V., Chapter 7, "Cohesive Properties and Solubility," pp. 189-225, (1990).

Wang et al., "Nano-$CaCO_3$ /polypropylene composites made with ultra-high-speed mixer," *Journal of Materials Science Letters 21*, pp. 985-986, (2002).

Yu et al., "Novel Uncured Epoxy Resin/$CaCO_3$ Nanocomposites," *Polymer-Plastics Technology and Engineering*, 45: pp. 809-813, (2006).

Yu et al., "Preparation of Exoxy Resin $CaCo_3$ Nancomposites and Performance of Resultant Powder Coatings," *Journal of Applied Polymer Science*, vol. 101, pp. 2656-2660, (2006).

Yu et al., "Study on nano-$CaCO_3$ modified epoxy powder coatings," *Progress in Organic Coatings*, 55, pp. 296-300, (2006).

Zhang et al., "Preparation and characterization of polystyrene/butyl acrylate/ nano-$CaCO_3$ composites," *Journal of Beijing University Chemical Technology*, 32, pp. 1-4, (2005), English Abstract.

ASTM Designation: D 5045-99, "Standard Test Methods for Plane-Strain Fracture Toughness and Strain Energy Release Rate of Plastic Materials," (2007) 9 pages.

ASTM Designation: D 2583-07, "Standard Test Method for Indentation Hardness of Rigid Plastics by Means of a Barcol Impressor," (2001) 4 pages.

Handbook of Thermoset Plastics, Second Edition, Sidney H. Goodman, Ed. (1998) p. 122.

PCT/US2009/047150 International Search Report dated Oct. 27, 2009, 3 pages.

METHODS OF COMPOUNDING NANOPARTICLES WITH A RESIN

CROSS REFERENCE TO RELATED APPLICATIONS

This application is a national stage filing under 35 U.S.C. 371 of PCT/US2009/047150, filed Jun. 12, 2009, which claims priority to Provisional Application No. 61/060,887, filed Jun. 12, 2008, the disclosure of which is incorporated by reference in its/their entirety herein.

FIELD

The present disclosure relates to methods of compounding nanoparticles with a resin, e.g., a curable resin. The methods use continuous milling technology and can be used to compound nanoparticles, including highly agglomerated surface-modified nanoparticles, into a resin or resin precursor. For example, in some embodiments, methods according to the present disclosure can be used to compound nanoparticles into reactive monomer species at high milling temperatures, even in the presence of low boiling, volatile co-monomers. In some embodiments, the nanoparticle-containing resin systems produced by some methods of the present disclosure have low viscosities, show little or no signs of monomer advancement or loss of volatile components, and cure to provide composites containing well-dispersed nanoparticles.

SUMMARY

Briefly, in one aspect, the present disclosure provides a method of preparing a nanoparticle-containing resin system comprising mixing nanoparticles with a reactive monomer resin system to form a mixture that is substantially free of an effective amount of solvent and dispersant, and milling the mixture in a first continuous wet milling apparatus comprising milling beads to form a first milled resin system.

In some embodiments, the nanoparticles comprise surface-modified nanoparticles. In some embodiments, at least one component of the reactive monomer resin system is a low-boiling-temperature volatile component. In some embodiments the mixture is substantially free of an inhibitor.

In some embodiments, no greater than 5% of the reactive monomers in the first milled resin system are polymerized as a result of the milling process. In some embodiments, the amount of each component of the reactive monomer resin system in the first milled mixture is at least 95% of the amount of that component of the reactive monomer resin system in the mixture entering the mill.

In some embodiments, the temperature of the mixture entering the first milling apparatus is no greater than 30° C. In some embodiments, the difference between the temperature of the first milled resin system and the temperature of the mixture entering the first milling apparatus is selected from the group consisting of no greater than 40° C., no greater than 30° C., no greater than 20° C., no greater than 10° C., and no greater than 5° C.

In some embodiments, the method further comprises milling the first milled resin system in a second continuous, wet milling apparatus comprising milling beads to form a second milled resin system, optionally wherein the first milling apparatus and the second milling apparatus are the same milling apparatus.

The above summary of the present disclosure is not intended to describe each embodiment of the present invention. The details of one or more embodiments of the invention are also set forth in the description below. Other features, objects, and advantages of the invention will be apparent from the description and from the claims.

DETAILED DESCRIPTION

Figure 1:
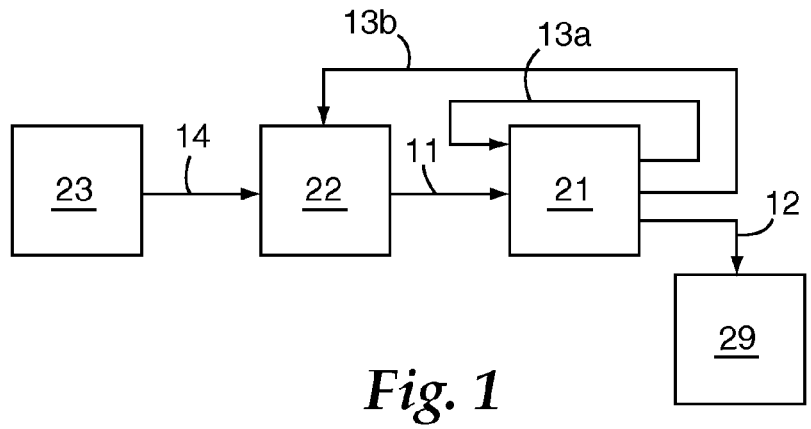
FIG. 1 is a schematic diagram of an exemplary solventless milling process according to some embodiments of the present disclosure.

As used herein, "agglomerated" is descriptive of a weak association of primary particles usually held together by charge or polarity. Agglomerated particles can typically be broken down into smaller entities by, for example, shearing forces encountered during dispersion of the agglomerated particles in a liquid.

In general, "aggregated" and "aggregates" are descriptive of a strong association of primary particles often bound together by, for example, residual chemical treatment, covalent chemical bonds, or ionic chemical bonds. Further breakdown of the aggregates into smaller entities is very difficult to achieve. Typically, aggregated particles are not broken down into smaller entities by, for example, shearing forces encountered during dispersion of the aggregated particles in a liquid.

Generally, curable resin systems are used in a wide variety of applications, e.g., as a protective layer (e.g., gel coats) and as the impregnation resin in composites (e.g., fibrous composites). Resin systems are often selected based on the desired mechanical properties of the final product including, e.g., hardness, toughness, fracture resistance, and the like. In some applications, the optical appearance of the finished product may be important such that properties like clarity and haze must be considered. In addition, process conditions may lead to preferred ranges for properties such as viscosity. Finally, the desired end use of the product often leads to additional requirements, e.g., erosion resistance or anti-blistering.

Generally, any known curable resin may be used in the various embodiments of the present disclosure. In some embodiments, the curable resin may be an ethylenically-unsaturated curable resin. For example, in some embodiments, an unsaturated polyester resin may be used. In some embodiments, the unsaturated polyester resin is the condensation product of one or more carboxylic acids or derivatives thereof (e.g., anhydrides and esters) with one or more alcohols (e.g., polyhydric alcohols).

In other embodiments, vinyl ester resins are used. As used herein, the term "vinyl ester" refers to the reaction product of epoxy resins with ethylenically-unsaturated monocarboxylic acids. Exemplary epoxy resins include bisphenol A digycidyl ether (e.g., EPON 828, available from Hexion Specialty Chemicals, Columbus, Ohio). Exemplary monocarboxylic acids include acrylic acid and methacrylic acid. Although such reaction products are acrylic or methacrylic esters, the term "vinyl ester" is used consistently in the gel coat industry. (See, e.g., Handbook of Thermoset Plastics (Second Edition), William Andrew Publishing, page 122 (1998).)

In still other embodiments, (meth)acrylate resins, including, e.g., urethane (meth)acrylates, polyethyleneglycol (multi)(meth)acrylates, and epoxy (multi)(meth)acrylates may be used. As used herein, the term (meth)acrylate refers to an acrylate and/or a methacrylate, i.e., ethyl (meth)acrylate refers to ethyl acrylate and/or ethyl methacrylate. In other embodiments, direct milling into epoxy resins may be achieved. Epoxy resins may contain diluents such as hexanedioldiglycidyl ether.

Depending on the selection of the curable resin, in some embodiments, the resin system may also include a reactive diluent. Exemplary reactive diluents include styrene, alpha-methylstyrene, vinyl toluene, divinylbenzene, triallyl cyanurate, methyl methacrylate, diallyl phthalate, ethylene glycol dimethacrylate, hydroxyethyl methacrylate, hydroxyethyl acrylate, and other mono- and multi-functional (meth)acrylates.

Generally, "surface modified nanoparticles" comprise surface treatment agents attached to the surface of a core. As used herein, the term "silica nanoparticle" refers to a nanoparticle having a silica surface. This includes nanoparticles that are substantially, entirely silica, as well nanoparticles comprising other inorganic (e.g., metal oxide) or organic cores having a silica surface. In some embodiments, the core comprises a metal oxide. Any known metal oxide may be used. Exemplary metal oxides include silica, titania, alumina, zirconia, vanadia, chromia, antimony oxide, tin oxide, zinc oxide, ceria, and mixtures thereof. In some embodiments, the core comprises a non-metal oxide.

Generally, a surface treatment agent is an organic species having a first functional group capable of chemically attaching (e.g., covalently or ionically bonding) or physically attaching (e.g., strong physisorptively attaching) to the surface of a nanoparticle, wherein the attached surface treatment agent alters one or more properties of the nanoparticle. In some embodiments, covalently-bonded surface treatment agents may be preferred. In some embodiments, surface treatment agents have no more than three functional groups for attaching to the core. In some embodiments, the surface treatment agents have a low molecular weight, e.g. a weight average molecular weight less than 1000 grams per mole. In some embodiments, the surface treatment agent is a silane. Exemplary silane surface treatment agents include methacryloxypropyltrimethoxysilane, phenyltrimethoxysilane, and polyethyleneglycol(trimethoxy)silane.

In some embodiments, the surface treatment agent further includes one or more additional functional groups providing one or more additional desired properties. For example, in some embodiments, an additional functional group may be selected to provide a desired degree of compatibility between the surface modified nanoparticles and one or more of the additional constituents of the resin system, e.g., one or more of the curable resins and/or reactive diluents. In some embodiments, an additional functional group may be selected to modify the rheology of the resin system, e.g., to increase or decrease the viscosity, or to provide non-Newtonian rheological behavior, e.g., thixotropy (shear-thinning).

In some embodiments, the surface-modified nanoparticles are reactive; that is, at least one of the surface treatment agents used to surface modify the nanoparticles of the present disclosure may include a second functional group capable of reacting with one or more of the curable resin(s) and/or one or more of the reactive diluent(s) of the resin system.

Particle size measurements can be based on, e.g., transmission electron microscopy (TEM). In some embodiments, the surface-modified nanoparticles have a primary particle size (as measured by TEM) of between about 5 nanometers to about 500 nanometers, and in some embodiments from about 5 nanometers to about 250 nanometers, and even in some embodiments from about 50 nanometers to about 200 nanometers. In some embodiments, the cores have an average diameter of at least about 5 nanometers, in some embodiments, at least about 10 nanometers, at least about 25 nanometers, at least about 50 nanometers, and in some embodiments, at least about 75 nanometers. In some embodiments the cores have an average diameter of no greater than about 500 nanometers, no greater than about 250 nanometers, and in some embodiments no greater than about 150 nanometers.

In some embodiments, silica nanoparticles can have a particle size of ranging from about 5 to about 150 nm. Commercially available silicas include those available from Nalco Chemical Company, Naperville, Ill. (for example, NALCO 1040, 1042, 1050, 1060, 2327 and 2329) and Nissan Chemical America Company, Houston, Tex. (e.g., SNOWTEX-ZL, -OL, -O, -N, -C, -20L, -40, and -50).

In some embodiments, the core is substantially spherical. In some embodiments, the cores are relatively uniform in primary particle size. In some embodiments, the cores have a narrow particle size distribution. In some embodiments, the core is substantially fully condensed. In some embodiments, the core is amorphous. In some embodiments, the core is isotropic. In some embodiments, the core is at least partially crystalline. In some embodiments, the core is substantially crystalline. In some embodiments, the particles are substantially non-agglomerated. In some embodiments, the particles are substantially non-aggregated in contrast to, for example, fumed or pyrogenic silica.

Nanoparticles, including surface-modified nanoparticles, have been compounded into curable resins to alter the properties of the resulting cured resin system. For example, U.S. Pat. No. 5,648,407 (Goetz et al.) describes, among other things, curable resins comprising colloidal microparticles in curable resin, and the use of such particle-containing resins in combination with reinforcing fibers. International Patent Publication No. WO2008/027979 (Goenner et al.) describes, among other things, resin systems comprising one or more crosslinkable resins, one or more reactive diluents, and a plurality of reactive, surface-modified nanoparticles.

Traditionally, nanoparticles have been compounded into resins using a combination of solvent exchange and solvent stripping processes. In addition to being time-consuming and requiring the use of multiple solvents, such processes often expose the curable resins to high temperatures. Such high temperatures can lead to oligomerization and other undesirable reactions during the compounding process with a resultant increase in viscosity. In addition, low-boiling-temperature components (e.g., volatile reactive diluents) may be lost during these compounding steps.

The present inventors have discovered alternative procedures for combining nanoparticles, including agglomerated nanoparticles, into a resin. These procedures do not require the use of solvents, and are compatible with low boiling point resins. In addition, such methods may be used to compound curable resins without causing premature cure.

In the methods of the present disclosure, surface-modifying agents are reacted onto the nanoparticles prior to a milling operation. The surface-modifying agents are attached to the nanoparticles through covalent bonds. In some embodiments, the surface-modified nanoparticles are dried prior to their addition to the resin. Upon drying, the surface-modified nanoparticles may become highly agglomerated.

Generally, the methods of the present disclosure include a milling step. Specifically, continuous, wet grinding milling technology is used to compound surface-modified silica nanoparticles (e.g., highly agglomerated surface-modified silica nanoparticles) into reactive monomer resin systems.

Milling technology or wet grinding media milling is known to those skilled in the art as a mechanism to provide particle size reduction of particles, e.g., aggregated particles, as well as a method to disperse particles into fluids. However, in many applications of milling, the medium into which the particles are dispersed is comprised of at least a solvent and may include a resin or additional reactive monomer species. In addition, the frictional heating that can occur during typical milling or compounding steps can elevate the temperature and contribute to undesirable monomer advancement and loss of low-boiling-point, volatile components.

In addition to using a solvent, prior milling approaches have also relied on the use of one or more dispersing and/or compatibilizing agents to mitigate viscosity increases that frequently accompany particle size reductions in processes such as milling. Polymeric dispersants are typically added during the compounding operations. Typical high molecular weight dispersants are polymeric and have weight average molecular weights (Mw) of greater than 1000 gm/mole, or even greater than 2000 gm/mole.

Despite these known limitations, the present inventors discovered a milling process compatible with monomer systems containing low-temperature-boiling, volatile monomers (i.e., monomers having a boiling point of less than 190° C. (e.g., less than 175° C., or even less than 150° C.) at atmospheric pressure. In some embodiments, the methods of the present disclosure minimize or substantially eliminate volatilization of these components during the compounding process; thus, avoiding the costly and time-consuming step of re-adding these species after the compounding process is complete. In some embodiments, the mixture resulting from milling heated monomer systems with the functionalized silica nanoparticles shows low viscosity and little or no sign of monomer advancement or loss of volatile components, even at relatively high nanoparticle solids loadings.

In some embodiments, the mixture of nanoparticles and resin to be milled contains at least 30 wt. %, in some embodiments, at least 35 wt. % nanoparticles, and in some embodiments, at least 40 wt. %, or even at least 45 wt. % nanoparticles. E.g., in some embodiments, the mixture comprises 38-45 wt. % nanoparticles.

Generally, the milling process of the present disclosure may be used to compound functionalized silica nanoparticles into reactive monomer systems containing no effective amount (e.g., less than 5%, less than 1% or even less than 0.5% by weight, including 0%) of solvent or diluent. In some embodiments, the methods of the present disclosure are accomplished with out an effective amount (e.g., less than 1% or even less than 0.5% by weight, including 0%) of a traditional dispersing agent.

Generally, the milling processes of the present disclosure provide a short heat contact time which reduces resin advancement and the loss of volatile components. The lack of resin advancement during milling was particularly surprising as, in contrast to prior art efforts, no additional inhibitors have been added to reduce or prevent advancement even when using monomer systems that are susceptible to free-radical polymerization upon heating.

An exemplary compounding process according to some embodiments of the present disclosure is shown in FIG. 1. As shown by arrow 11, a mixture of surface-modified nanoparticles and a curable resin is fed into continuous, wet milling apparatus 21. As shown by arrow 12, the milled output of the continuous, wet milling apparatus 21 may be collected in container 29, or, as shown by arrows 13a and 13b, some or all of the milled output may be fed back to receive further milling. Following arrow 13a, some or all of the milled output may be fed back to the entrance of continuous, wet milling apparatus 21. Also, following arrow 13b, some or all of the milled output may be discharged in a vessel or process upstream of the continuous, wet milling apparatus 21, e.g., into optional heated holding tank 22. In some embodiments, the milled output may be combined with additional amounts of resin and nanoparticles prior to a subsequent milling operation.

In some embodiments, the resin, surface-modified nanoparticles, and optionally other additives, are premixed using, e.g., high-speed mixer 23 to obtain a coarse dispersion. Following arrow 14, in some embodiments, this coarse dispersion may be fed into a holding tank, e.g., heated holding tank 22. In some embodiments, the coarse dispersion may be fed directly into the continuous wet milling apparatus 21.

Generally, the milling apparatus is a continuous wet media milling apparatus. In some embodiments, the milling apparatus comprises milling beads, e.g., ceramic milling beads. Although the milling apparatus used is a wet media mill, no solvents or additional liquids need to be added, as the curable resin components themselves provide sufficient lubrication. Thus, despite the use of a wet milling process, methods of the present disclosure can provide substantially solvent-free compounding of nanoparticles in a resin.

In some embodiments, prior to their addition to the resin, the surface-modified nanoparticles are dried to remove residual solvent. In some embodiments, the surface-modified nanoparticles contain no greater than 2% by weight residual solvent. In some embodiments, the surface-modified nanoparticles contain no greater than 1%, e.g., no greater than 0.5%, or even no greater than 0.2% by weight residual solvent.

In some embodiments, the temperature of the mixture entering the milling apparatus is no greater than 30° C. However, in some embodiments, it may be desirable to preheat the mixture prior to milling to, e.g., 50° C., 80° C., or even higher. Despite the absence of traditional solvents, the present inventors determined that milling could proceed without an unacceptable increase in the temperature of the milled mixture. In some embodiments, the difference between the temperature of the milled resin system exiting the milling apparatus and the temperature of the mixture entering the milling apparatus is no greater than 40° C., e.g., no greater than 30° C., no greater than 20° C., no greater than 10° C., or even, no greater than 5° C.

In some embodiments, the temperature rise (i.e., the difference between the temperature of the material exiting the mill and the temperature of the material entering the mill) can be controlled to minimize or eliminate undesirable losses in volatile components such as reactive diluents. For example, in some embodiments, the amount of each component of the reactive monomer resin system in the milled mixture exiting the milling apparatus is at least 95 wt. % (e.g., at least 98%, or even at least 99 wt. %) of the amount of that component of the reactive monomer resin system in the mixture entering the milling apparatus.

In additional, the temperature can be controlled to minimize or eliminate the undesirable reaction of the various components of the milled mixed. For example, in some embodiments, no greater than 5 wt. % (e.g., no greater than 2 wt. %, or even no greater than 1 wt. %) of the reactive monomers in the milled resin system are polymerized. This result can be obtained even when the resin system is substantially free of an inhibitor, which is typically used to prevent premature reaction in a milling operation.

EXAMPLES

Methods

Rheometric analysis of the nanocomposite samples was conducted on an ARES RHEOMETRIC SCIENTIFIC rheometer (TA instruments, New Castle, Del.) in Couvette mode.

Cured samples for transmission electron microscopy (TEM) observation were microtomed at room temperature. All samples were cut to a thickness of 87 nm, therefore a direct comparison could be made between the different percent particle loadings. The samples were viewed using a Hitachi H-9000 transmission electron microscope.

Fracture toughness ($K_{1C}$) was measured according to ASTM D 5045-99, except that a modified loading rate of 0.13 cm/minute (0.050 inches/minute) was used. A compact tension geometry was used, wherein the specimens had nominal dimensions of 3.18 cm by 3.05 cm by 0.64 cm (1.25 inches (in.) by 1.20 in. by 0.25 in.). The following parameters were employed: W=2.54 cm (1.00 in.); a=1.27 cm (0.50 in.); B=0.64 cm (0.25 in.). Measurements were made on between 6 and 10 samples for each resin tested. Average values for $K_{1C}$ were reported in units of megapascals times the square root of meters, i.e., MPa($m^{1/2}$). Only those samples meeting the validity requirements of ASTM D 5045-99 were used in the calculations.

Barcol hardness (HB) was measured according to ASTM D 2583-95 (Reapproved 2001). A BARCOL IMPRESSOR (Model GYZJ-934-1, available from Barber-Colman Company, Leesburg, Va.) was used to make measurements on specimens having a nominal thickness of 0.64 cm (0.25 in.). For each sample, between 5 and 10 measurements were made and the average value reported.

Flexural storage modulus (E') was measured using an RSA2 Solids Analyzer (obtained from Rheometrics Scientific, Inc., Piscataway, N.J.) in the dual cantilever beam mode. The specimen dimensions had nominal measurements of 50 millimeters long by 6 millimeters wide by 1.5 millimeters thick. A span of 40 millimeters was employed. Two scans were run, the first having a temperature profile of: –25° C. to +125° C. and the second scan having a temperature profile of –25° C. to +150° C. Both scans employed a temperature ramp of at 5° C./minute, a frequency of 1 Hertz and a strain of 0.1%. The sample was cooled after the first scan using refrigerant at an approximate rate of 20° C./minute after which the second scan was immediately run. The flexural modulus at +25° C. on the second scan was reported. The tan delta peak of the second scan was reported as the glass transition temperature (Tg).

Materials

Nanoparticle-containing resin systems were prepared using the prior-art solvent-exchange and solvent-stripping processes. The properties of these samples were compared to nanoparticle-containing resin systems prepared by the solventless milling methods according to some embodiments of the present disclosure. The materials used to prepare the samples are summarized in Table 1.

TABLE 1

Materials used in the preparation of samples.

| Material | Description | Source |
|---|---|---|
| JEFFCO 1401-21 Resin | A multifunctional epoxy resin | Jeffco Products San Diego, CA. |
| JEFFCO 4101-21 | Cycloaliphatic-amine blend | Jeffco Products |
| Fast Hardener | hardener | |
| NALCO 2327 | Colloidal silica sol (ca. 20 nm) (40% solids in water) | Nalco Chem. Co. Chicago, IL |
| NALCO 2329 | Colloidal silica sol (ca. 98 nm) (40% solids in water) | Nalco Chem. Co. |
| HYDREX 100 HF | Blend of vinyl ester resin and styrene monomer | Reichhold, Durham, NC |
| HK-1 | GDW8082 lot (B7101519) unsaturated polyester/styrene blend | HK Research Hickory, NC |
| Phenyl-trimethoxysilane | Phenyltrimethoxysilane | Alfa Aesar Ward Hill, MA |
| SILQUEST A-1230 | Polyethyleneglycol-(trimethoxy)silane | Momentive, Friendly, WV |
| SILQUEST A-174 | Methacryloxypropyl-trimethoxysilane | Momentive |
| MEKP | Methylethylketone peroxide catalyst | HK Research |
| 4-hydroxy-TEMPO | 4-hydroxy-2,2,6,6-tetramethyl piperidinyloxy (5 wt. % in water) | Aldrich |

Preparation of Surface-Modified Nanoparticles.

NP-1. The NP-1 surface-modified nanoparticles were prepared as described for Organosol A of U.S. Pat. No. 5,648,407. First, 595 g of 2-Methoxyethanol, 8.3 g of the phenyltrimethoxysilane surface treatment agent, and 7.0 g of SILQUEST A-1230 were added to 1000 g of NALCO 2329 hydrosol while stirring. Then, the mixture was heated to 80° C. for 24 hours. The surface modified silica sol was dried in a vacuum oven on aluminum pans at 100° C. for 24 hours.

NP-2. The NP-2 surface-modified nanoparticles were prepared as follows. First, NALCO 2329 (1000 g) was combined with 12.2 g of SILQUEST A-1230, 6 g of SILQUEST A-174 and 626 g methoxypropanol while stirring. Then, the mixture was heated to 80° C. for 24 hours. The surface modified silica sol was dried in a vacuum oven on aluminum pans at 100° C. for 24 hours.

NP-3. The NP-3 surface-modified nanoparticles were prepared by adding NALCO 2329 (1600 g) to a gallon size glass jar. 1-Methoxy-2-propanol (1800 g), SILQUEST A-174 (10.51 g) and SILQUEST A-1230 (21.17 g) were slowly added to the aqueous silica sol while stirring. The jar was sealed and heated for 16 hours at 80° C. The sample was then concentrated by rotary evaporation to 70 wt. % silica. The concentrated surface modified silica sol was dried according to the procedures described in the U.S. Pat. No. 5,980,697 (Kolb et al.) and U.S. Pat. No. 5,694,701 (Huelsman, et al.) with a dispersion coating thickness of about 0.25 mm (10 mils) and a residence time of 1.1 minutes (heating platen temperature 107° C., and condensing platen temperature 21° C.) to yield a fine, free-flowing white powder.

NP-4. The NP-4 surface-modified nanoparticles were prepared by adding NALCO 2329 (1600 g) to a gallon size glass jar. 1-methoxy-2-propanol (1800 g), SILQUEST A-174 (10.45 g) and SILQUEST A-1230 (21.05 g) were slowly added to the aqueous silica sol while stirring. The jar was sealed and heated for 16 hours at 80° C. The sample was then concentrated by rotary evaporation to 70 wt. % silica. The concentrated surface-modified silica sol was then dried according to the procedures described in the U.S. Pat. No. 5,980,697 (Kolb et al.) and U.S. Pat. No. 5,694,701 (Huelsman, et al.) with a dispersion coating thickness of about 0.25 mm (10 mils) and a residence time of 1.1 minutes (heating platen temperature 107° C., and condensing platen temperature 21° C.) to yield a fine, free-flowing white powder.

The surface-modified nanoparticles were dispersed in curable resins using typical solvent-based techniques, as described below. Formulation details of these resin systems of Comparative Examples 1-3 are shown in Table 2. Solids determination (wt %) was confirmed by thermogravimetric analysis.

TABLE 2

Comparative Example formulation details.

| Ex. | Particle | Resin | % Silica |
|---|---|---|---|
| CE-1 | NP-1 | JEFFCO 1401-21 | 40 |
| CE-2 | NP-2 | HYDREX 100 HF | 40 |
| CE-3 | NP-3 | HK-1 | 40 |

CE-1. The surface-modified nanoparticle-containing resin system of Comparative Example 1 was prepared by mixing the NP-1 organosol with 640 g of JEFFCO 1401-21. The solvent was removed in vacuo according to the procedures outlined in U.S. Pat. No. 5,648,407 (Goetz et al.). The resulting composition contained 40 wt. % silica.

CE-2. The surface-modified nanoparticle-containing resin system of Comparative Example 2 was prepared by mixing the NP-2 organosol with HYDREX 100 HF and solvent was removed in vacuo according to the procedures set forth in International Patent Publication No. WO2008/027979 (Goenner et al.). As some styrene was lost during solvent removal, sufficient styrene was back-added to obtain a 40 wt. % solids loading of silica.

CE-3. The surface-modified nanoparticle-containing resin system of Comparative Example 3 was prepared using the NP-3 nanoparticles. The dry surface-modified nanoparticles (338.95 g) and acetone (800 g) were high shear mixed using a SILVERSON L4R mixer (available from Silverson Machines, Limited, Chesham, England) set at half-speed for 10 minutes. HK-1 resin (461.05 g) and 4-hydroxy-TEMPO (1.8 g) were added to the surface-modified particles in acetone. The acetone was removed via rotary evaporation and gas chromatography confirmed no acetone was in the sample. 703.2 g of the sample were collected and additional styrene (62.9 g) and methyl methacrylate (20.1 g) were added to complete the CE-3 resin system.

Examples 1-3

The surface-modified nanoparticles were dispersed in curable resins using milling techniques according to some embodiments of the present disclosure, as described below. Formulation details of these resin systems of Examples 1-3 are shown in Table 3.

TABLE 3

Nanoparticle-containing resin system compositions.

| | Nanoparticles | | Resin | |
|---|---|---|---|---|
| Ex. | Sample | Amount | Type | Amount |
| 1 | NP-1 | 800 g | JEFFCO 1401 | 1200 g |
| 2 | NP-2 | 800 g | HYDREX 100 HF | 1200 g |
| 3 | NP-4 | 549 g | HK-1 | 755 g |

For EX-1, the NP-1 surface-modified nanoparticle organosol was dried in vacuo at 100° C. for 24 hours prior to compounding. Similarly, for EX-2 the NP-2 surface-modified nanoparticle organosol was dried in vacuo at 100° C. for 24 hours prior to compounding.

The resin systems of EX-1 and EX-2 were processed as follows. Multiple 500 g lots of each nanoparticle-containing resin system were prepared by weighing the appropriate ratio of surface-modified nanoparticles and resins into size 600 DAC mixing cups (FlacTek Inc., Landrum, S.C.). Each 500 g lot was then mixed using a DAC 600 FVZ Speedmixer™ (FlacTek Inc.) for 4 minutes at room temperature, creating coarse dispersions of the surface-modified nanoparticles in resin. The multiple lots of these coarse dispersions were placed into a jacketed stainless steel 400 milliliter vessel, and stirred using a DISPERMAT laboratory dissolver (BYK-Gardner, Columbia, Md.). The resin system of EX-1 was heated using a STERLCO heater during this mixing step. The resulting mixture was delivered to the mill (0.15 L MINICER, Netszch Fine Particle Technology, Exton, Pa.), set to 4320 rpm, through the use of a peristaltic pump (MASTERFLEX LS, Cole Parmer, Vernon Hills, Ill.) at the flow rates and temperatures listed in Table 4.

The resin system of EX-3 was prepared as follows. The NP-4 dry surface-modified nanoparticles (548.92 g), HK-1 resin (754.63 g) and 4-hydroxy-TEMPO (3.02 g) were mixed together and delivered to the mill (0.15 L MINICER), set to 4320 rpm, through the use of a peristaltic pump at the flow rate and temperatures listed in Table 4.

TABLE 4

Solventless milling conditions.

| | Milling Temperature | | Flowrate |
|---|---|---|---|
| Ex. | Entrance | Exit | (ml/min) |
| 1 | 80° C. | 80° C. | 240 |
| 2 | 23° C. | 60° C. | 240 |
| 3 | 23° C. | 55° C. | 240 |

Figure 2:
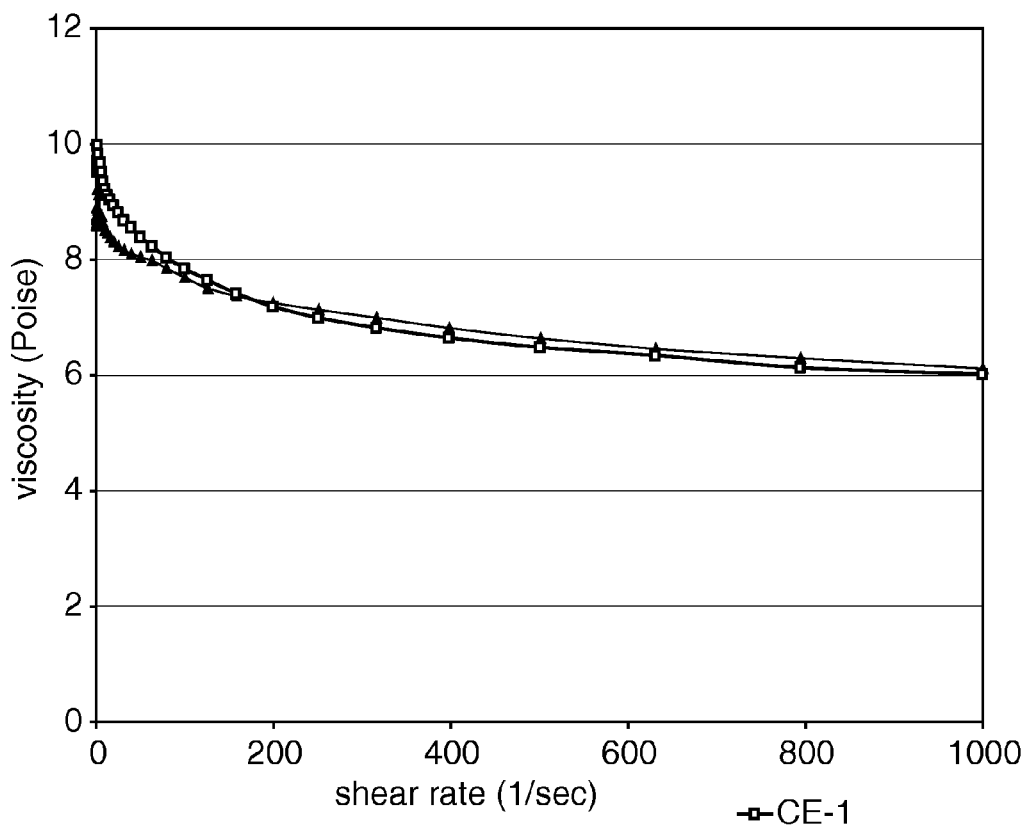
FIG. 2 is graph of viscosity as a function of shear rate for Example 1 and Comparative Example 1.
Figure 3:
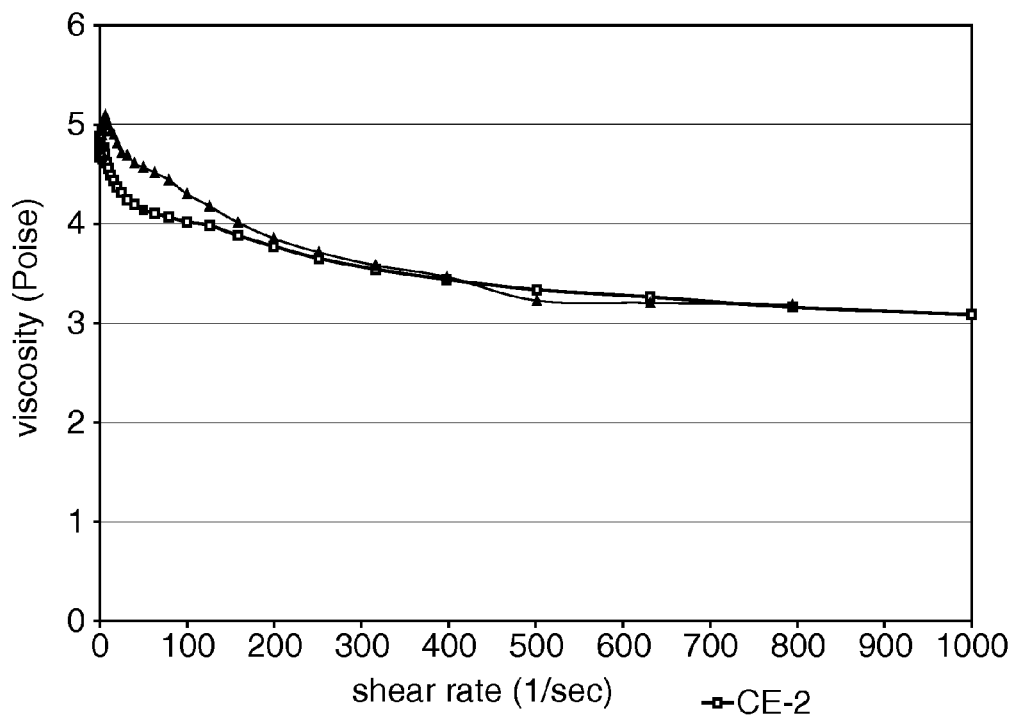
FIG. 3 is graph of viscosity as a function of shear rate for Example 2 and Comparative Example 2.

Uncured samples of Examples EX-1 and EX-2 and Comparative Examples CE-1 and CE-2 were examined rheometrically to determine their respective changes in viscosity as a function of frequency and comparing the batch-derived, solvent-processed materials (CE-1 and CE2) to their milled, solventless-processed counterparts (EX-1 and EX-2). As shown in FIG. 2 (comparing the rheology of EX-1 to CE-1) and FIG. 3 (comparing the rheology of EX-2 to CE-2) resin systems containing well-dispersed nanoparticles are produced by the solventless milling processes of the present disclosure.

Figure 4A:
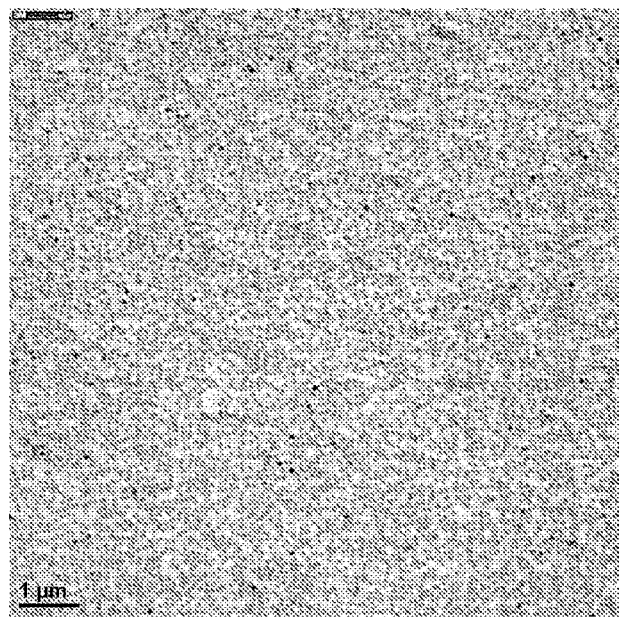
FIGS. 4A-4C are photomicrographs (in order of increasing magnification) of a cured nanoparticle-containing resin system milled according to some embodiments of the present disclosure.
Figure 4B:
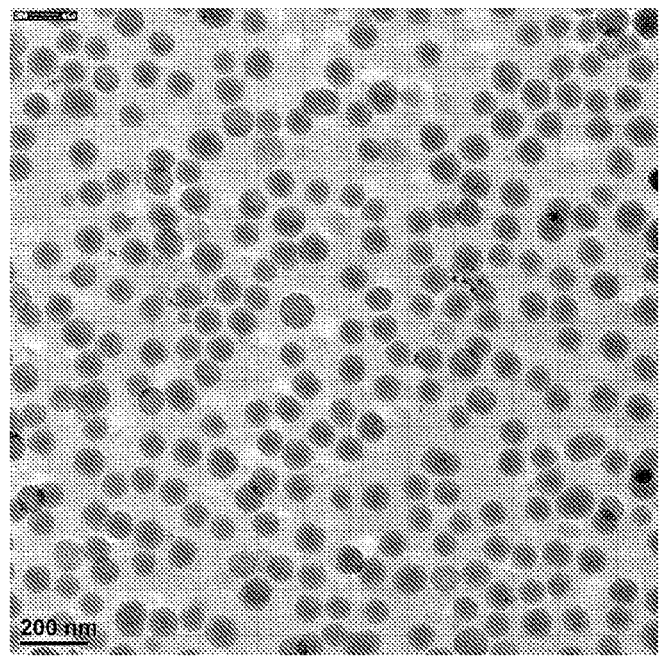
Figure 4C:
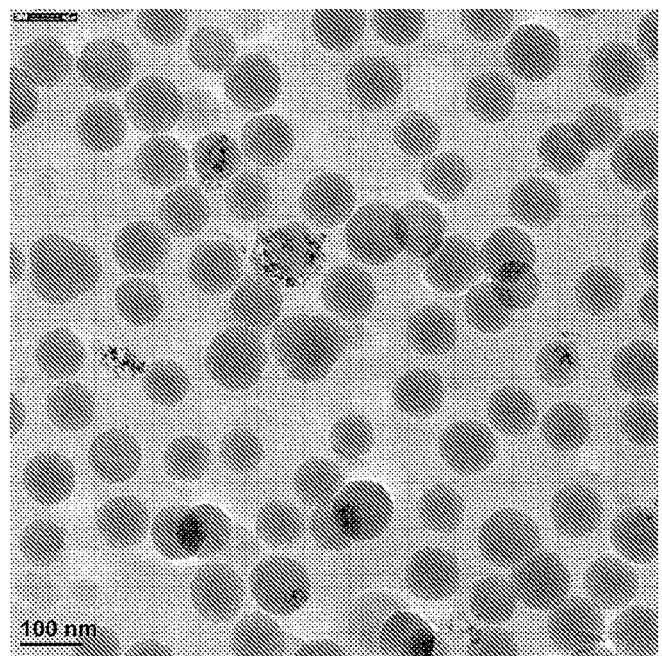

The nanoparticle-containing resin system of EX-1 (52.3 g) was cured by addition of 10.1 g of JEFFCO 4101 hardener and the resultant cured plaques were examined by TEM to determine the extent of dispersion, which is thought to be a clear indication of effective surface treatment. Representative TEM micrographs of a cured sample of EX-1 are shown in order of increasing magnification in FIGS. 4A-4C. As illustrated by these micrographs, the solventless milling process of the present disclosure is capable of producing a dispersion of non-agglomerated, non-aggregated nanoparticles in a resin. This result was achieved even though the resin system was substantially free of a dispersant (i.e., the resin system contains less than effective amount of dispersant, e.g., less than 1 wt. % or even less than 0.5 wt. % by weight, including 0 wt. % of a traditional dispersing agent).

Cured samples of EX-3 and CE-3 were prepared as follows. Into a wide-mouth plastic container having a lid were placed a sample of the nanoparticle-containing resin system and 1.00 wt. % cobalt solution (JK 8033, available from HK Research (Hickory, N.C.)). The container was sealed and the contents were mixed at 2000 rpm for 30 seconds using a SpeedMixer™ dual asymmetric centrifuge (Model DAC 600 FVZ-sp, available from Flack Tek, Incorporated). 1.25 wt. % methyl ethyl ketone peroxide (MEKP B0410 46-702, available from HK Research (Hickory, N.C.)) was then added. The container was sealed and the contents mixed at 2000 rpm for 30 seconds using the SpeedMixer™. After mixing, the nanoparticle-containing resin system was transferred to a float glass mold treated with VALSPAR MR 225 release material. The sample was then allowed to cure at room temperature for 24 hours and then post-cured at 70° C. for 4 hours.

The cured samples were tested to determine fracture toughness, Barcol hardness, flexural modulus, and glass transition temperature, according to the test methods described herein. The results are shown in Table 5.

TABLE 5

Physical Property Results for Examples 3 and CE-3.

| Example | $K_{1C}$ [MPa (m$^{1/2}$)] | Hardness ($H_B$) | E' [MPa] | Tg [° C.] |
| --- | --- | --- | --- | --- |
| EX-3 | 0.69 | 65 | 7.0 | 130 |
| CE-3 | 0.68 | 65 | 6.8 | 130 |

A comparison of physical properties of Example 3 and Comparative Example CE-3 support the conclusion that the solventless milling process of the present disclosure produces similar dispersion quality as previous solvent-based dispersion methods.

Various modifications and alterations of this invention will become apparent to those skilled in the art without departing from the scope and spirit of this invention.

What is claimed is:

1. A method of preparing a nanoparticle-containing resin system comprising mixing surface-modified silica nanoparticles with a reactive monomer resin system to form a mixture, wherein the mixture comprises less than 5% by weight solvent and less than 1% by weight of a dispersant; and milling the mixture in a first continuous wet milling apparatus comprising milling beads to form a first milled resin system.

2. The method claim 1, wherein at least one component of the reactive monomer resin system is a low-boiling-temperature volatile component having a boiling point of less than 190° C. at atmospheric pressure.

3. The method of claim 1, wherein the mixture comprises less than 1% by weight of solvent and less than 0.5% by weight of the dispersant.

4. The method of claim 1, wherein the mixture is substantially free of an inhibitor.

5. The method of claim 1, wherein no greater than 5 wt. % of the reactive monomers in the mixture are polymerized in the first milled resin system.

6. The method of claim 1, wherein the temperature of the mixture entering the first milling apparatus is no greater than 30° C.

7. The method of claim 1, wherein the temperature of the mixture entering the first milling apparatus is at least 50° C.

8. The method of claim 1, wherein the difference between the temperature of the first milled resin system and the temperature of the mixture entering the first milling apparatus is no greater than 20° C.

9. The method of claim 1, wherein the amount of each component of the reactive monomer resin system in the first milled mixture is at least 95 wt. % of the amount of that component of the reactive monomer resin system in the mixture.

10. The method of claim 1, further comprising milling the first milled resin system in a second continuous wet milling apparatus comprising milling beads to form a second milled resin system.

11. The method of claim 1, wherein the mixture comprises at least 30% by weight nanoparticles.

12. The method of claim 1, wherein the resin is selected from the group consisting of a vinyl ester resin and an unsaturated polyester resin.

13. The method of claim 1, wherein the resin comprises styrene.

14. The method of claim 1, wherein the nanoparticles comprise silica nanoparticles surface-modified with a silane surface-treatment agent.

15. The method of claim 1, wherein the resin is an epoxy resin.

* * * * *

UNITED STATES PATENT AND TRADEMARK OFFICE
CERTIFICATE OF CORRECTION

PATENT NO. : 8,448,885 B2
APPLICATION NO. : 12/996730
DATED : May 28, 2013
INVENTOR(S) : James M Nelson Page 1 of 1

It is certified that error appears in the above-identified patent and that said Letters Patent is hereby corrected as shown below:

Title Page 2, Col. 1, item (56) (Other Publications)
Line 10, delete "plante-wave" and insert -- plane-wave --

Title Page 2, Col. 2, item (56) (Other Publications)
Line 19, delete "Exoxy" and insert -- Epoxy --

Line 19, delete "Nancomposites" and insert -- Nanocomposites --

In the Specifications:

Column 2
Line 60, delete "digycidyl" and insert -- diglycidyl --

Column 5
Line 50, delete "with out" and insert -- without --

Column 10
Line 5, delete "(FlacTek" and insert -- (FlackTek --

Line 7, delete "(FlacTek" and insert -- (FlackTek --

Line 16 (approx.), delete "Netszch" and insert -- Netzsch --

Column 11
Line 4, delete "Flack Tek," and insert -- FlackTek, --

In the Claims:

Line 42, in claim 4, delete "method" and insert -- method of --

Signed and Sealed this
Fifteenth Day of October, 2013

Teresa Stanek Rea
*Deputy Director of the United States Patent and Trademark Office*